United States Patent
Sovine et al.

(10) Patent No.: US 10,145,294 B2
(45) Date of Patent: Dec. 4, 2018

(54) CHARGE AIR COOLER SHROUD MOUNTING SYSTEM WITH ONE FIXED AND THREE FLOATING ATTACHMENT POINTS

(71) Applicant: FORD GLOBAL TECHNOLOGIES, LLC, Dearborn, MI (US)

(72) Inventors: Michael Brett Sovine, Canton, MI (US); Jeff James Cremering, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 14/949,213

(22) Filed: Nov. 23, 2015

(65) Prior Publication Data

US 2017/0145902 A1   May 25, 2017

(51) Int. Cl.
*F02B 29/04*   (2006.01)
(52) U.S. Cl.
CPC ...... *F02B 29/0431* (2013.01); *F02B 29/0456* (2013.01); *Y02T 10/146* (2013.01)
(58) Field of Classification Search
CPC ..... B60K 11/04; F02B 29/045; F02B 29/0462
See application file for complete search history.

(56) References Cited

U.S. PATENT DOCUMENTS

| | | | | |
|---|---|---|---|---|
| 6,202,737 B1* | 3/2001 | Mahe | ................... | F28D 1/0435 165/140 |
| 6,386,273 B1* | 5/2002 | Hateley | ................... | F28F 9/002 165/149 |
| 6,705,387 B2* | 3/2004 | Kokubunji | ............. | B60K 11/04 165/140 |
| 7,367,379 B2* | 5/2008 | Heine | ................... | F28D 1/0435 165/140 |
| 7,637,309 B2* | 12/2009 | Contet | .................. | F28D 1/0435 165/67 |
| 7,644,979 B2* | 1/2010 | Bauernfeind | .......... | B60K 13/02 296/193.09 |
| 8,016,025 B2* | 9/2011 | Brost | .................. | F02B 29/0462 165/149 |
| 9,091,468 B2* | 7/2015 | Colpan | ................... | F25B 39/04 |
| 2006/0118285 A1* | 6/2006 | Emrich | ................. | F28D 1/0535 165/173 |

(Continued)

FOREIGN PATENT DOCUMENTS

CN   103184920 A   7/2013
DE   102012112113 A1   6/2014

(Continued)

OTHER PUBLICATIONS

English machine translation of CN103184920A.

(Continued)

*Primary Examiner* — Long T Tran
(74) *Attorney, Agent, or Firm* — Julia Voutyras; King & Schickli, PLLC

(57) ABSTRACT

A charge air cooler shroud mounting system is provided. The charge air cooler shroud has a body having a four point attachment system including a mounting aperture, a first lug, a second lug and a third lug. The mounting aperture provides a fixed point of attachment while the lugs provide a plurality of floating points of attachment.

15 Claims, 6 Drawing Sheets

(56) References Cited

U.S. PATENT DOCUMENTS

| | | | |
|---|---|---|---|
| 2006/0201663 A1* | 9/2006 | Strahle | F28D 9/0031 165/164 |
| 2010/0089548 A1* | 4/2010 | Braic | F28D 7/1692 165/51 |
| 2011/0088886 A1* | 4/2011 | Kalbacher | F28F 9/0226 165/178 |
| 2014/0182290 A1* | 7/2014 | Bhide | F01N 13/1816 60/612 |
| 2014/0216385 A1* | 8/2014 | Bruggesser | F02B 29/0462 123/184.21 |
| 2015/0292819 A1* | 10/2015 | Woollen | F28F 9/001 165/157 |

FOREIGN PATENT DOCUMENTS

| | | |
|---|---|---|
| EP | 1602808 B1 | 3/2007 |
| EP | 1764572 A1 | 3/2007 |

OTHER PUBLICATIONS

English machine translation of DE102012112113A1.
English machine translation of EP1602808B1.
English machine translation of EP1764572A1.

\* cited by examiner

CHARGE AIR COOLER SHROUD MOUNTING SYSTEM WITH ONE FIXED AND THREE FLOATING ATTACHMENT POINTS

TECHNICAL FIELD

This document relates generally to the motor vehicle equipment field and, more particularly, to a charge air cooler shroud mounting system including one fixed and three floating attachment points to allow for thermal expansion and contraction of the charge air cooler.

BACKGROUND

The thermal expansion and contraction of a charge air cooler is significant. Thus the charge air cooler shroud must be attached in a way that allows for the free expansion and contraction of the charge air cooler in order to provide long term durability and extended service life.

In order to meet this end, the charge air cooler shroud disclosed herein relies on a four point attachment strategy including one fixed point of attachment and three floating points of attachment that function to accommodate the expansion and contraction of the charge air cooler.

SUMMARY

In accordance with the purposes and benefits described herein, a charge air cooler shroud mounting system is provided. That charge air cooler shroud mounting system comprises a charge air cooler body having four attachment points including a mounting aperture, a first lug, a second lug and a third lug. In one possible embodiment the first lug includes a rib.

The mounting aperture provides a first fixed point of attachment. The first lug provides a second point of attachment allowing movement only in a first plane. The second and third lugs provide respective third and fourth points of attachment allowing movement in the first plane and a second plane. In one particularly useful embodiment, the first plane extends in a horizontal direction and the second plane extends in a vertical direction.

In one possible embodiment, the first lug is received in a snap clip. The second lug is received in a first channel. The third lug is received in a second channel. Both the first channel and the second channel are three-sided.

More specifically, the snap clip includes a retaining lug and a resilient arm overlying and spaced from the retaining lug. Further the resilient arm includes an engagement tab for engaging the first lug.

In accordance with an additional aspect, a method is provided for securing a charge air cooler shroud in position on a charge air cooler. That method may be broadly described as comprising the step of attaching the charge air cooler shroud to the charge air cooler by means of a single fixed point of attachment and a plurality of floating points of attachment. In one particularly useful embodiment, the method includes providing three floating points of attachment.

In one possible embodiment, the method includes allowing a first floating point of attachment to move only in a first plane. Further the method may include allowing a second floating point of attachment to move in the first plane and a second plane substantially perpendicular to the first plane. Still further, the method may include allowing a third floating point of attachment to move in the first and second planes.

In accordance with yet another aspect, the method may include orienting the first plane in a horizontal direction and the second plane in a vertical direction. Further, the method may include positioning the fixed point of attachment and the first floating point of attachment above the second floating point of attachment and the third floating point of attachment. Still further, the method may include utilizing an aperture in the charge air cooler shroud as the fixed point of attachment.

In the following description, there are shown and described several preferred embodiments of the charge air cooler shroud mounting system. As it should be realized, the charge air cooler shroud mounting system is capable of other, different embodiments and its several details are capable of modification in various, obvious aspects all without departing from the charge air cooler shroud mounting system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the charge air cooler shroud mounting system and together with the description serve to explain certain principles thereof. In the drawing figures.

Reference will now be made in detail to the present preferred embodiments of the charge air cooler shroud mounting system, examples of which are illustrated in the accompanying drawing figures.

DETAILED DESCRIPTION

Figure 1:
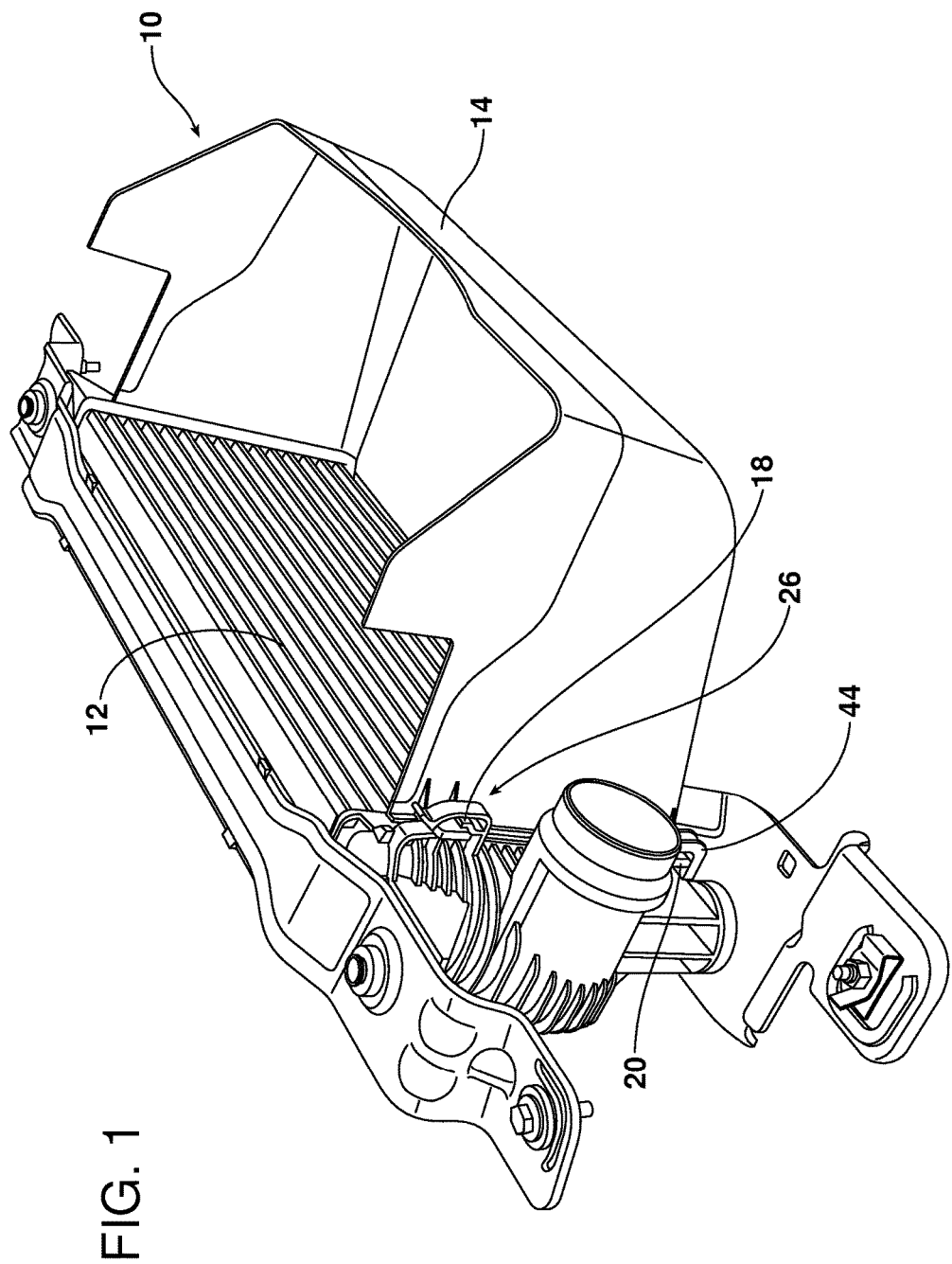
FIG. 1 is a perspective view illustrating a charge air cooler shroud secured to a charge air cooler.

Reference is now made to FIG. 1 illustrating the charge air cooler shroud 10 connected to a charge air cooler 12. As illustrated in the FIGS. 1-5B, the charge air cooler shroud 10 includes a body 14 having four points of attachment comprising a mounting aperture 16, a first lug or blade 18, a second lug or blade 20 and a third lug or blade 22.

Figure 2:
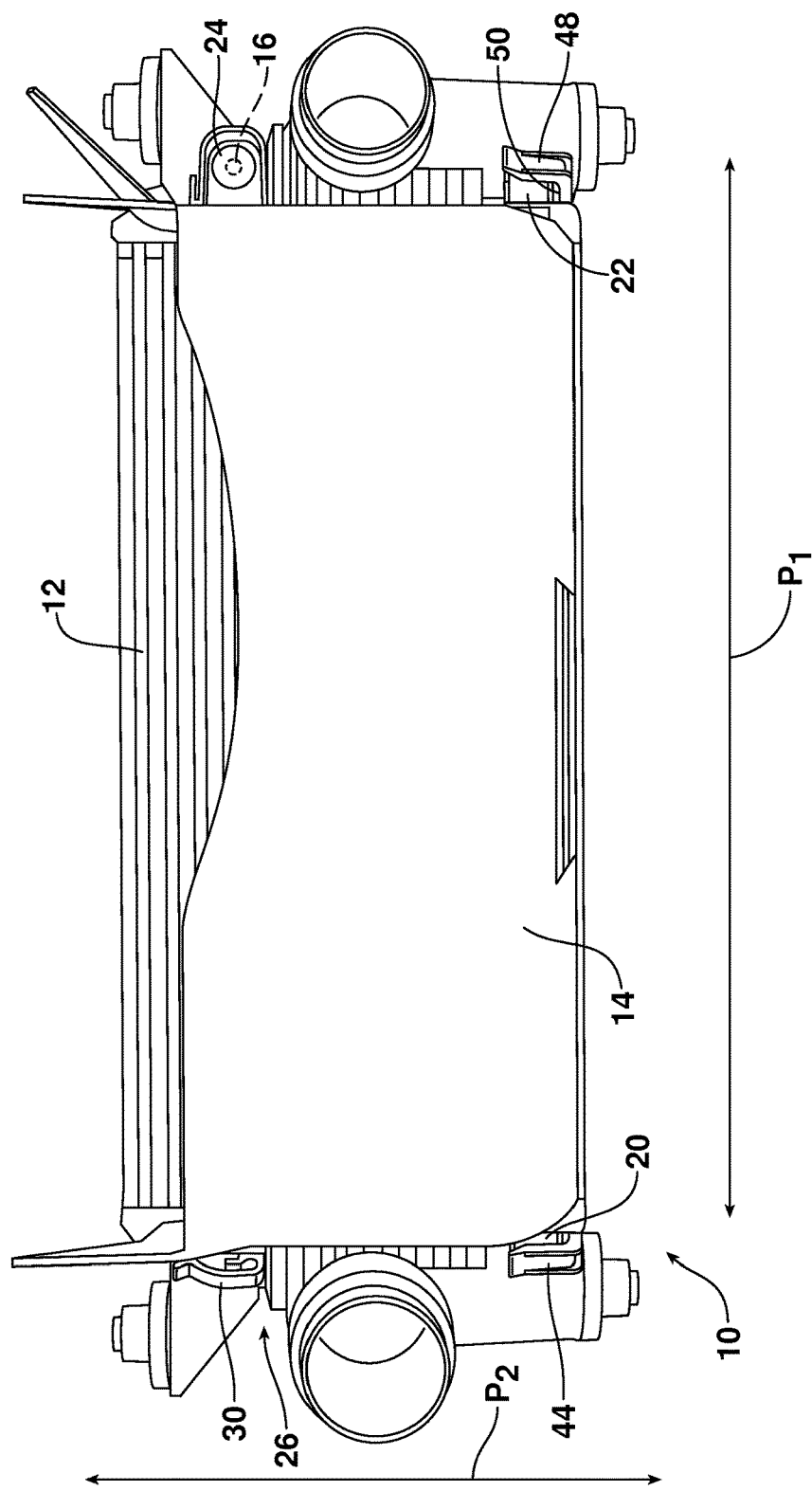
FIG. 2 is a rear elevational view of the charge air cooler shroud shown in FIG. 1 and clearly illustrating all four points of attachment between the shroud and the charge air cooler.
Figure 3:
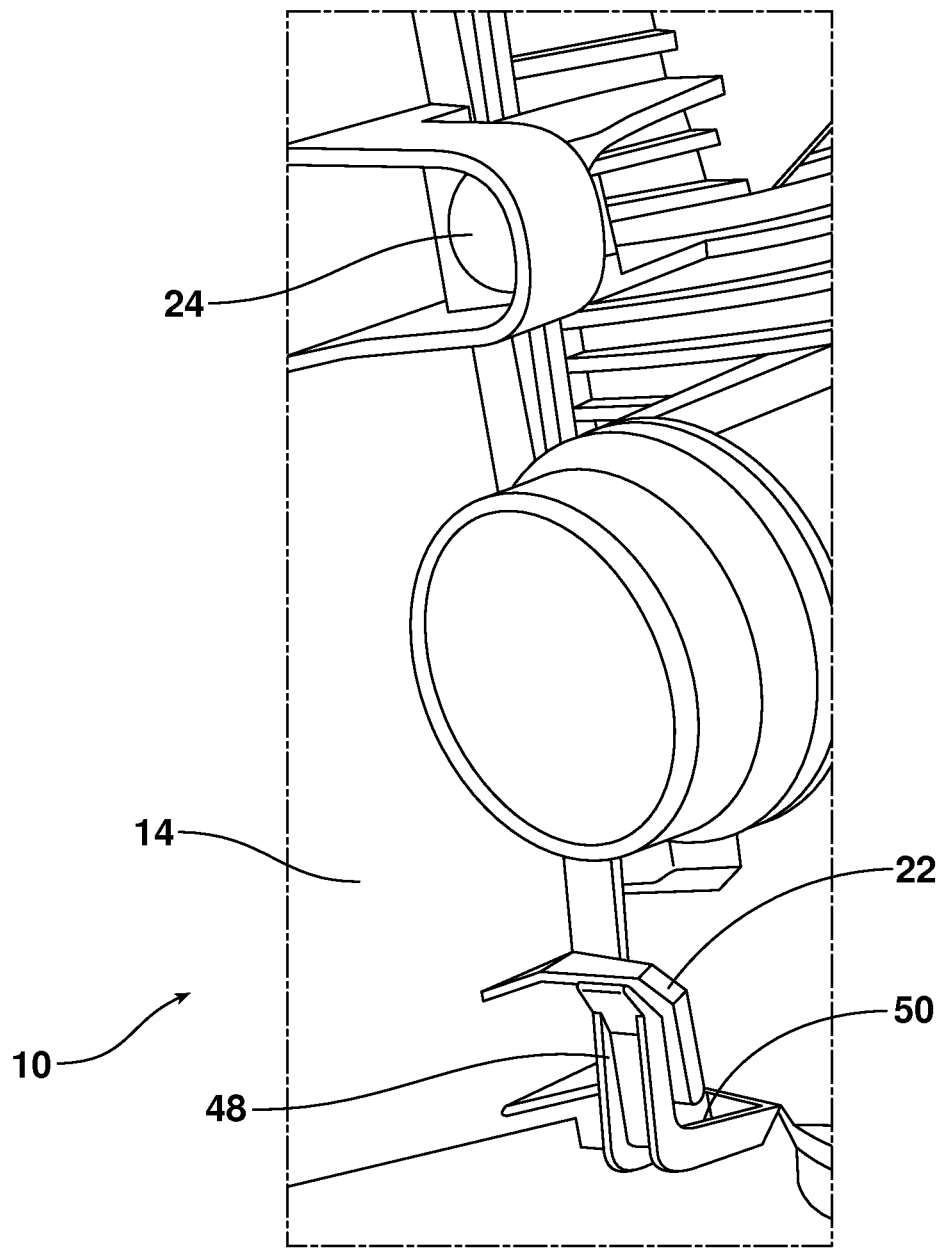
FIG. 3 is a detailed perspective view illustrating the first and third points of attachment of the charge air cooler shroud with the charge air cooler.

As illustrated in FIGS. 2 and 3, the mounting aperture 16 receives a fastener 24, such as a screw or bolt, that threadedly engages in a threaded aperture (not shown) in the charge air cooler 12 thereby providing a fixed point of attachment for the charge air cooler shroud 10 to the charge air cooler 12.

Figure 4:
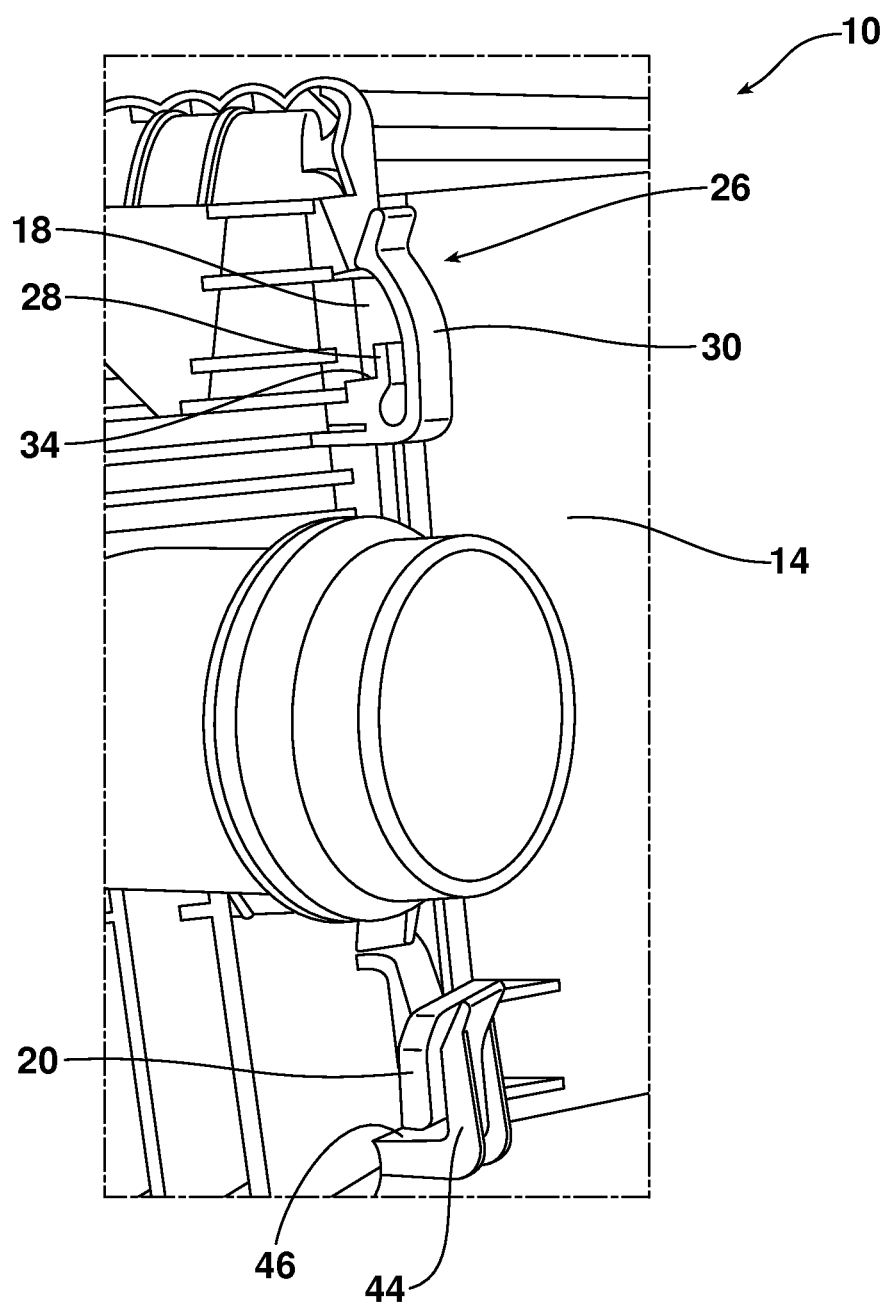
FIG. 4 is a detailed perspective view illustrating the second and fourth points of attachment of the charge air cooler shroud with the charge air cooler.
Figure 5A:
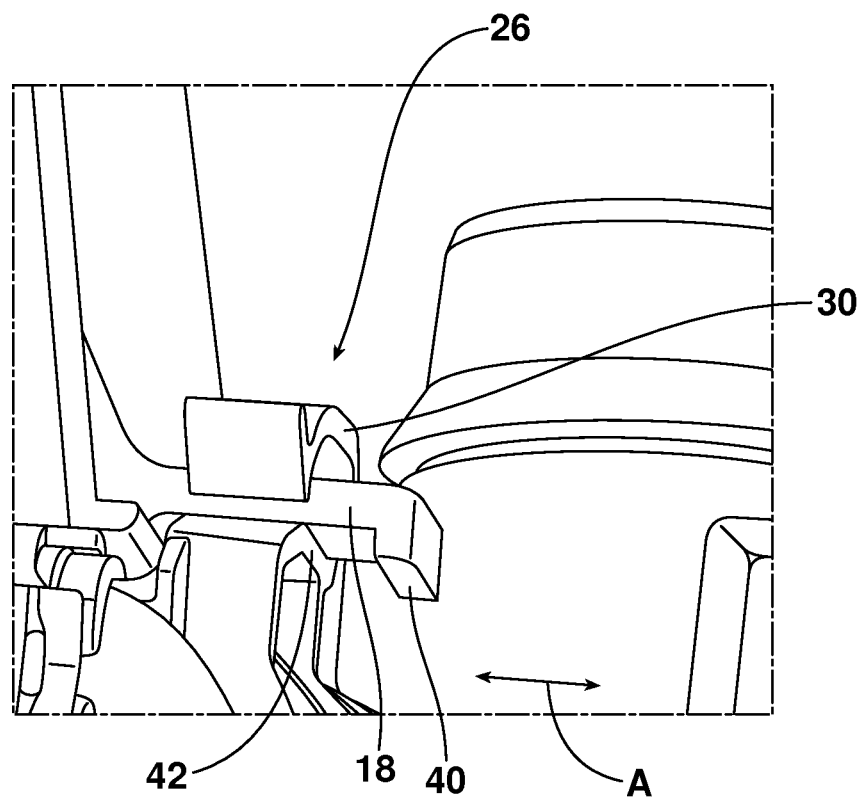
FIGS. 5A and 5B illustrate in detail the first floating point of attachment including a ribbed lug received in a snap clip.
Figure 5B:
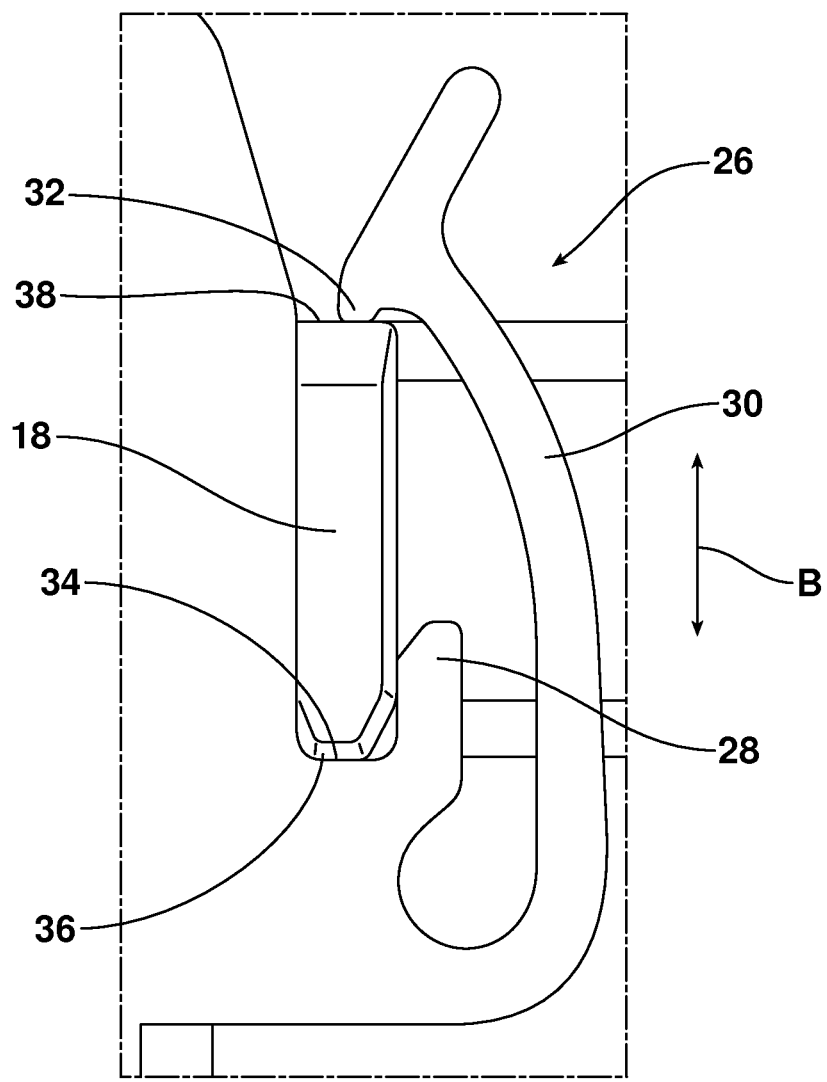

As illustrated in FIGS. 4, 5A and 5B, the first lug 18 is received in a snap clip 26 carried on the charge air cooler 12. The snap clip 26 includes a retaining lug 28 and a resilient arm 30 including an engagement tab 32. As best illustrated in FIGS. 4 and 5B, the retaining lug 28 forms a channel 34 for receiving the bottom edge 36 of the lug 18 while the engagement tab 32 engages the top edge 38 of the lug 18.

As should be appreciated from reviewing FIGS. 5A and 5B, the first lug 18 slides freely through the snap clip 26 between the retaining lug 28 and the engagement tab 32 in order to accommodate expansion and contraction of the charge air cooler 12 in a first or horizontal plane illustrated by action arrow A in FIG. 5A. A rib 40 provided on the end of the lug 18 engages an edge 42 of the snap clip 26 so as to prevent the lug from pulling through the snap clip 26 at any time.

In contrast, as should be appreciated from viewing FIG. 5B, the engagement tab 32 and channel 34 prevent relative movement of the lug 18 in a second or vertical plane as illustrated by action arrow B.

As illustrated in FIG. 4, a hook 44 on the charge air cooler 12 forms a first channel 46 for receiving the second lug 20. Similarly, a hook 48 on the charge air cooler 12 forms a second channel 50 for receiving the third lug 22. As illustrated both of the channels 46, 50 are three-sided and open at the top end. Thus, as should be appreciated the third and fourth attachment points provided by the second and third lugs 20, 22 allow for relative movement between the charge air cooler shroud 10 and the charge air cooler 12 in a first plane $P_1$ which extends in a horizontal direction and in a second plane $P_2$ which extends in a vertical direction (see FIG. 2).

Consistent with the structures identified above, a method is provided for securing a charge air cooler shroud 10 in position on a charge air cooler 12. That method may be broadly described as comprising the step of attaching the charge air cooler shroud 10 to the charge air cooler 12 by means of a single fixed point of attachment (the mounting aperture 16 and fastener 24) and a plurality of floating points of attachment. More specifically, three floating points of attachment have been described. The first floating point of attachment is provided between the first lug 18 and the snap clip 26 allowing relative movement between the charge air cooler shroud 10 and the charge air cooler 12 in a single, first or horizontal plane $P_1$.

The second floating point of attachment is provided by the second lug 20 received in the first channel 46 formed for the hook 44. The third floating point of attachment is provided by the third lug 22 received in the second channel 50 formed by the hook 48. The second and third floating points of attachment allow for relative movement between the charge air cooler 12 and the charge air cooler shroud 10 in a first plane $P_1$ and a second plane $P_2$ substantially perpendicular to the first plane. More specifically, in the illustrated embodiment the first plane $P_1$ extends in the horizontal direction while the second plane $P_2$ extends in the vertical direction.

As best illustrated in FIG. 2, the method may also include positioning the fixed point of attachment provided by the mounting aperture 16 and fastener 24 and the first floating point of attachment provided by a first lug 18 and a snap clip 26 above the second and third floating points of attachment provided by the second and third lugs 20, 22 and the hooks 44, 48.

In summary, numerous benefits are provided by the charge air cooler shroud mounting system. As noted above, the charge air cooler shroud 10 provides for three floating points of attachment at the lugs 18, 20, 22 which fully accommodate the thermal expansion and contraction of the charge air cooler 12 thereby enhancing the durability of the connection between the charge air cooler 12 and the charge air cooler shroud 10.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A charge air cooler shroud mounting system, comprising:
    a charge air cooler shroud body having four attachment points including a mounting aperture, a first lug, a second lug and a third lug, wherein said mounting aperture provides a first fixed point of attachment, said first lug provides a second point of attachment allowing movement only in a first plane, said second lug provides a third point of attachment allowing movement in said first plane and a second plane and said third lug provides a fourth point of attachment allowing movement in said first plane and said second plane.

2. The charge air cooler shroud mounting system of claim 1 wherein said first lug includes a rib.

3. The charge air cooler shroud mounting system of claim 1, wherein said first plane extends in a horizontal direction and said second plane extends in a vertical direction.

4. The charge air cooler shroud mounting system of claim 1, further including a snap clip and wherein said first lug is received in said snap clip.

5. The charge air cooler shroud mounting system of claim 4, further including a first channel and wherein said second lug is received in said first channel.

6. The charge air cooler shroud mounting system of claim 5, further including a second channel and wherein said third lug is received in said second channel.

7. The charge air cooler shroud mounting system of claim 6, wherein said first channel and said second channel are both three sided.

8. The charge air cooler shroud mounting system of claim 7, wherein said snap clip includes a retaining lug and a resilient arm overlapping and spaced from said retaining lug.

9. The charge air cooler shroud mounting system of claim 8, wherein said resilient arm includes an engagement tab engaging said first lug.

10. The charge air cooler shroud mounting system of claim 4, wherein said snap clip includes a retaining lug and a resilient arm overlapping and spaced from said retaining lug.

11. The charge air cooler shroud mounting system of claim 10, wherein said resilient arm includes an engagement tab engaging said first lug.

12. A method of securing a charge air cooler shroud in position on a charge air cooler, comprising:
    attaching said charge air cooler shroud to said charge air cooler by means of a single fixed point of attachment and three floating points of attachment;
    further including allowing a first floating point of attachment to move only in a first plane, allowing a second floating point of attachment to move in said first plane and a second plane substantially perpendicular to said first plane, and allowing a third floating point of attachment to move in said first plane and said second plane.

13. The method of claim 12, including orienting said first plane in a horizontal direction and said second plane in a vertical direction.

14. The method of claim 12, including positioning said fixed point of attachment and said first floating point of attachment above said second floating point of attachment and said third floating point of attachment.

15. The method of claim 14, including utilizing an aperture on said charge air cooler shroud as said fixed point of attachment.

* * * * *